Patented Apr. 10, 1928.

1,665,881

UNITED STATES PATENT OFFICE.

EUGEN HUTZENLAUB, OF STUTTGART-GAISBURG, GERMANY, ASSIGNOR TO FIRM PAUL LECHLER, OF STUTTGART, GERMANY.

BITUMINOUS PRODUCT AND METHOD OF MAKING SAME.

No Drawing. Application filed June 26, 1926, Serial No. 118,859, and in Germany July 8, 1925.

My invention refers to watery mixtures of organic substances, more especially bituminous or resinous substances, and to means whereby mixtures of this kind can be easily produced which are substantially permanently stable and are moreover insoluble in water at ordinary temperature.

My invention has particular reference to tarry products containing water, which are adapted for use in the tarring of roads, concrete structures and the like.

According to my invention mixtures containing bituminous or resinous substances and water can be obtained which differ from the well known aqueous emulsions in so far as they form a cream-like paste which is not easily soluble in water at ordinary temperature. Obviously such a mixture offers considerable advantages as compared with the water-soluble emulsions hitherto used for the purposes specified.

In producing such mixture I prefer proceeding at first substantially as in the production of a watery emulsion, this process being however interrupted before such a watery emulsion has been formed. In order to be able to interrupt the process at the right moment I add to the solution of the bituminous or resinous component, which shall form the effective constituent of the mixture, either a considerably smaller quantity of an emulsifying agent than would be required for complete emulsification in water, or a small quantity of an emulsion containing bituminous or resinous matter. Into this mixture water is then gradually introduced until the mixture begins absorbing the water. Before a watery emulsion can form the mixture gradually changes over from a thinly fluid condition to a highly viscous cream-like condition. When this latter condition has been reached, the process is interrupted. The product thus obtained is on the border between the dispersion of water in the organic matter and the dispersion of organic matter in water and is sharply distinguished from emulsions mixable in water by not being capable of mixing with water but merely absorbing it under vigorous stirring.

The new product being a creamy mixture of bituminous matter, oil and water or in another case resinous matter, oil and water, offers particular advantages as compared with watery solutions or watery emulsions inasmuch as it can be produced at far lower cost than a solution, water being always cheaper than any organic solvent, while it is preferable to a watery emulsion in being almost or totally insoluble in water. These advantages render the new product particularly adapted for the tarring of the surfaces of roads, concrete structures and the like. The tarring of roads with these new products can be effected as in the case of watery emulsions in cold condition, while the tars hitherto used for the same purpose have to be heated to at least 230°. In this manner the danger of scalding, the strong smell and the like connected with the hot tar are avoided. Moreover the new creamy product can also be applied to moist roads in contradistinction to the hot tar which requires altogether dry roads free from dust, while the new product owing to the contents of water forms a sort of binder between the moist road surface and the tar proper. In contradistinction to the well known tar emulsions it is not easily soluble in water and therefore is not subjected to the danger of being washed away by rain. The new product can therefore be applied to the surfaces of roads, concrete structures and the like even in rainy weather, thereby offering valuable economic advantages. This is particularly noticeable in the case of concrete structures which need not be dry when the new product is applied.

*Example 1.*

65 parts by weight of pitch and 35 parts by weight of tar oil, 2 parts by weight of an emulsion containing bituminous matter and 100 parts by weight of water are well mixed with the aid of a suitable stirring device until the mixture has attained the form of a cream-like paste.

*Example 2.*

75 kgs. coal tar freed by distillation from light oil and containing at least 55 per cent of pitch are mixed as before described with 10 kgs. of lime milk and 15 kgs. of water.

*Example 3.*

40 kgs. of coal tar pitch are melted with 15 kgs. of petroleum pitch and 45 kgs. of anthracene oil. The molten mixture is mixed under stirring first with 0,5 kgs. of oleic acid and thereafter with 30 kgs. of a dilute soda solution until a cream-like paste has formed. It will be obvious that the oils as specified in the above examples are readily distinguished from fatty oils, volatile hydrocarbons (gasoline, benzol, turpentine), oil of wintergreen and others which are generally unsuitable, by the fact that the oils which are preferably used are "essentially hydrocarbon substantially not readily volatile oils".

The term "aqueous emulsion" as used herein, is one in which water or an aqueous liquid constitutes the continuous phase. As stated, my product is not an aqueous emulsion.

I wish it to be understood that I do not desire to be limited to the exact substances, proportions, and sequence of operations described for obvious modifications will occur to a person skilled in the art.

The term "bituminous" as hereinafter used, is intended to embrace resinous and tarry materials, as well.

I claim:—

1. As a new product, a stable mixture of a bituminous substance and water, such mixture having the form of a cream-like paste which is substantially non-miscible with water at ordinary temperature, such product containing a small amount of an emulsifying agent, but insufficient to form an aqueous emulsion.

2. As a new product, a stable mixture of a tarry substance and water, such mixture having the form of a cream-like paste which is substantially non-miscible with water at ordinary temperature, such product containing a small amount of an emulsifying agent, but insufficient to form an aqueous emulsion.

3. As a new product, a stable mixture of a tarry substance, an essentially hydrocarbon not readily volatile oil and water, such mixture having the form of a cream-like paste which is substantially non-miscible with water at ordinary temperature, such product containing a small amount of an emulsifying agent, but insufficient to form an aqueous emulsion.

4. As a new product, a stable mixture of pitch, an essentially hydrocarbon not readily volatile oil and water and a small amount of an emulsifying agent but insufficient thereof to form an emulsion of said materials, such mixture having the form of a cream-like paste which is substantially non-miscible with water at ordinary temperature.

5. As a new product, a stable mixture of pitch, a tar oil and water, and a small amount of an emulsifying agent but insufficient thereof to form an emulsion of said materials, such mixture having the form of a cream-like paste which is substantally non-miscible with water at ordinary temperature.

6. As a new product, a stable cream-like pasty mixture containing about 55 parts by weight of pitch, 45 parts by weight of essentially hydrocarbon not readily volatile oil and a small amount of an emulsifying agent but insufficient thereof to form an aqueous emulsion of said materials and water in amount sufficient to give a cream-like emulsion, the amount of water being less than the combined amounts of the other ingredients.

7. The method of producing a stable mixture of a bituminous substance with water, which is substantially non-miscible with water at ordinary temperature, comprising mixing such substance with far less of an emulsifying agent than required for emulsification with water as an aqueous emulsion, and mixing the product thus obtained with so much water as is required for producing a highly viscous cream-like mixture containing the water and the bituminous substance.

8. As a new product, a stable cream-like pasty mixture containing a quantity of an essentially hydrocarbon not readily volatile oil, a substantially greater amount of pitch, and water in amount not greater than the combined amounts of said oil and pitch, and a small amount of an emulsifying agent, but less thereof than enough to form an aqueous emulsion.

In testimony whereof I affix my signature.

EUGEN HUTZENLAUB.